(12) United States Patent
Fuchs et al.

(10) Patent No.: US 7,281,758 B2
(45) Date of Patent: Oct. 16, 2007

(54) VEHICLE SLIDING SUNROOF

(75) Inventors: Gerhard Fuchs, St. Andrä-Wördern (AT); Paul Gross-Gottschall, Vienna (AT); Günter Konlechner, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 37 days.

(21) Appl. No.: 11/211,948

(22) Filed: Aug. 25, 2005

(65) Prior Publication Data

US 2006/0066141 A1 Mar. 30, 2006

(30) Foreign Application Priority Data

Aug. 25, 2004 (DE) ............ 10 2004 041 168

(51) Int. Cl.
*B60J 7/00* (2006.01)
*B60J 7/057* (2006.01)

(52) U.S. Cl. ............ 296/214; 296/223

(58) Field of Classification Search ........... 296/214, 296/223
See application file for complete search history.

(56) References Cited

U.S. PATENT DOCUMENTS

| | | | | |
|---|---|---|---|---|
| 5,250,882 A | | 10/1993 | Odoi et al. | ......... 318/467 |
| 5,951,100 A | * | 9/1999 | Ewing et al. | ......... 296/214 |
| 6,129,413 A | * | 10/2000 | Klein | ......... 296/220.01 |
| 6,409,261 B1 | * | 6/2002 | Lindinger et al. | ......... 296/223 |
| 6,572,184 B2 | * | 6/2003 | Bauer et al. | ......... 296/223 |

FOREIGN PATENT DOCUMENTS

DE  4221043 C2  10/1994

\* cited by examiner

*Primary Examiner*—Dennis H. Pedder
(74) *Attorney, Agent, or Firm*—Baker Botts L.L.P.

(57) ABSTRACT

Device for opening/closing an opening in a vehicle roof by means of a transparent sunroof cover on the one hand and an opaque sunscreen cover on the other hand, which covers can be actuated separately from each other in accordance with a manual actuation of a control device, whereby, from a fully open or a fully closed position, the sunscreen cover can be moved first in the opening in each case.

19 Claims, 3 Drawing Sheets

VEHICLE SLIDING SUNROOF

CROSS-REFERENCE TO RELATED APPLICATIONS

This application claims priority to German Patent Application No. 10 2004 041 168.9, which was filed on Aug. 25, 2004, and is incorporated herein by reference in its entirety.

TECHNICAL FIELD

The present invention relates to a device for opening or closing an opening in a vehicle roof wherein a transparent sunroof cover on the one hand and an opaque sunscreen cover on the other hand can be operated by a drive system in accordance with a manual actuation of a control device.

BACKGROUND

A vehicle sunroof normally consists of a metal or glass part by means of which an opening in the roof panel can be closed partially or completely either manually or by remote control. If the sunroof is power-operated, the drive motor is generally housed directly in the roof itself or in the rear area of the vehicle. The power is transmitted via bowden cables or tensile-rigid or compressive-rigid cables. In addition to this sliding movement in the longitudinal direction of the vehicle, a lifting device is generally provided by means of which the rear edge of the glass part can be raised up above the roof panel.

Where a sunroof is made of glass, there is generally an opaque sliding cover, also called a roof lining part, arranged under the glass part to keep excessive solar radiation out of the passenger compartment. This roof lining part can also be moved either manually or under motor control (power-operated).

In the case of power-operated vehicle sunroofs where both the glass part and the roof lining part can each be moved in the roof opening independently of each other by means of separate drives, the fresh air supply and the amount of incident light can conveniently be controlled individually in the passenger compartment. In practice, however, this control over the settings is subject to certain restrictions. Thus, it must not be possible for the drives to be controlled in such a way that the cover part is wide open but the roof lining part is closed, since the roof lining part cannot permanently withstand the wind load acting on it when the vehicle is in motion.

DE 42 21 043 C2 discloses a sunroof for a vehicle wherein the possibility of a closed roof lining part coinciding with an open cover part is excluded by the control device. By this means weather conditions and air stream cannot damage the roof lining part if the cover part is open. A closed roof lining part would in any case not allow any increase in the air circulation in the passenger compartment. The movement of the cover is linked to the movement of the sun shade part in such a way that, when the switch is operated to open the cover, this results not just in the opening of the cover, but also in a selective opening movement of the sun shade part such that the sun shade part assumes a partially open position according to the position of the cover.

Although this linking of the movement of the sun shade part to the movement of the cover, wherein first the cover is moved and only then the sunscreen, protects the roof lining part from wind load in the middle of the sliding range, it is not felt by many vehicle drivers to be optimal in respect of driving comfort. If, when the vehicle sunroof is opened from a fully closed position, first the cover part is pushed back and only then the sunscreen, this sequence of movements does not seem to be in accord with the subjective expectations of many vehicle drivers. The same applies to the closing operation, where the sliding movement of the transparent cover part is detected through the initially only slowly reducing wind noise.

This linking is, however, also disadvantageous if the movement operation during opening or closing of a vehicle sunroof is to be better adapted to the respective climatic region in which the vehicle is predominantly used. For example, in a sunny, hot climate it can be desirable if a partial opening of the cover part simultaneously, by the linking of movement, also causes the sunscreen to follow only a short distance behind the cover part. Conversely, where the vehicle is used in cooler regions with lower levels of solar radiation, it can be felt to be thoroughly pleasant if an opening operation of the cover part, once triggered, simultaneously also opens the roof lining part by a correspondingly great distance, so that right at the starts of the movement more light enters the passenger compartment.

As the individual perception with respect to the linking of the opening and closing movement of the cover and roof lining part varies greatly from person to person, it is essentially desirable that a lag between cover and sunscreen can be adjusted by a control device in the passenger compartment.

SUMMARY

The object of the invention is to specify a device for opening or closing an opening in a vehicle roof providing improved convenience and simple operation.

This object can be achieved by a device for opening/closing an opening in a vehicle roof by means of a transparent sunroof cover on the one hand and an opaque sunscreen cover on the other, each of which can be actuated separately from the other as a function of a manual actuation of a control device, wherein, from a fully open or a fully closed position respectively, first the sunscreen cover can be slid in the opening.

The control device may comprise a first user control element with two directions of actuation, a first direction of actuation being assigned to opening and a second direction of actuation being assigned to closing. The control device may comprise a second user control element by means of which it is possible to set an offset by which the sunroof cover follows or precedes the sunscreen cover in a middle range of the sliding distance, in which middle range the sunroof cover and the sunscreen cover are moved in synchronism. The movement sequence during opening or closing can be dependent on the actuation time of the first user control element. A manual mode of operation or an automatic mode of operation can be selected as a function of the actuation time. The first user control element may have two switch positions in each direction of actuation, which positions are assigned to the sunscreen cover and in which positions the manual or automatic operating mode can be selected as a function of the actuation time, and wherein from this first switch position a second switch position that is assigned to the sunroof cover can be switched to. An actuation time of 0.2 seconds to one second may trigger the automatic operating mode and an actuation time greater than 1 second triggers the manual operating mode. The first user control element may have two switch positions in each direction of actuation, the first switch positions nearest to the zero position being assigned to the manual operating mode, and the two switch positions further away from the zero position being assigned to the automatic operating mode. The first user control element can be a two-stage rocker switch or a two-stage rotary knob. The second user control element can be a continuously variable rotary knob. There can be provided a resistance which must be overcome when actuating the first and/or second user control element.

It is a characteristic of the invention that at the start of an opening or closing movement, first of all the sunscreen cover part is moved and then only subsequent to that the cover part. This has the advantage that in an opening operation, first of all light enters the passenger compartment. Many vehicle drivers feel rather that an opening operation wherein not first fresh air but first light enters through the roof opening into the passenger compartment to be more pleasant. The driver also perceives a closing operation wherein first the roof lining part is moved and only then the cover part, as being more pleasant. When a closing operation is initiated, a shading effect begins immediately in the passenger compartment. Thus, a closing operation is noticeable immediately after it has been triggered.

Ergonomically it is favorable if the movement operation can be triggered by a single user control element, which control element has a dedicated direction of actuation for the opening and closing respectively.

In order to better adapt the opening or closing movement of the vehicle sunroof to the particular climatic conditions prevalent at the place of use, it is advantageous if the movement of cover and sunscreen is offset in the middle of the sliding range of the roof opening and if this offset can be preset by means of user control elements of a control device in the passenger compartment. Toward that end, the invention provides another user control element, for example a rotary knob, by means of which the driver can set a distance by which the sunroof cover precedes or follows the sunscreen cover.

In a preferred embodiment of the invention, a manual or an automatic mode of operation can be selected for the sequence of movements for opening or closing as a function of the switching time. This can be achieved for example by use of a rocker switch, whereby the movement of the sunscreen is triggered by one depression of the switch and the movement of the sunscreen cover starts when the switch is released.

A preferred embodiment has a user control element that provides two switch positions in each direction of actuation. From a zero position, in each case a first switch position can be switched, in which position, controlled by switching time, the manual or automatic operating mode can be selected. From each of these first switch positions, a further switch position can be switched in turn, which further position is assigned to the sunroof cover part.

In a preferred embodiment, an actuation time of approximately 0.2 seconds to one second is preset for selecting the automatic operating state. The selection of the manual operating state results from an actuation time greater than 1 second.

A development of this first control element as a two-stage rocker switch or two-stage rotary knob is ergonomically favorable.

BRIEF DESCRIPTION OF THE DRAWINGS

The invention is explained in greater detail below with reference to two exemplary embodiments and by the following description of the drawings.

DETAILED DESCRIPTION

Figure 1:
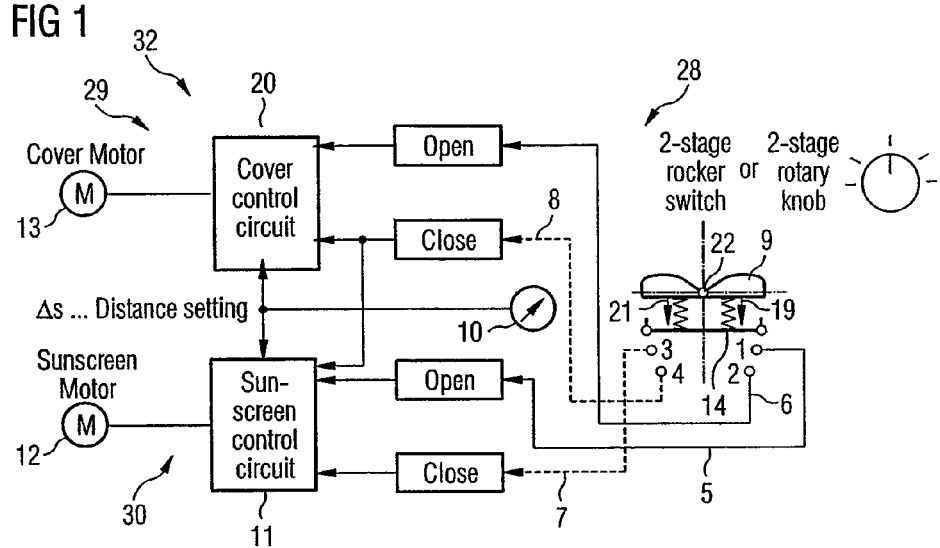
FIG. 1 shows a block diagram of a first exemplary embodiment in which the automatic operating mode is time-controlled.

FIG. 1 shows a first exemplary embodiment of the invention in which a manual or automatic mode of operation can be selected by switching time-dependent actuation of a user control element. In the block representation 28 denotes a control device consisting of a first user control element 9 and a second user control element 10. The opening or closing operation of the sunroof cover or of the sunscreen cover is controlled as a function of manual switching actions on these user control elements 9 and 10. In this arrangement the instruction to proceed is given by the user control element 9. User control element 10 can be used to set a distance by which the sunroof cover precedes or follows the sunscreen cover when both are moving in synchronism in a middle range of the slide path. The force to shift the two covers (denoted by the reference numbers 23, 24 in FIGS. 3 and 4) is generated by a drive system 32 consisting of drives 29 and 30 which are separate from each other. Each of said drives 29, 30 consists of an electric motor 12, 13 and a control circuit 11, 20. The control circuit 20 activates the electric motor 13 of the sunroof cover 23. The control circuit 11 activates the electric motor 12 of the sunscreen cover 24. The mechanical transmission of power, which is typically effected via gears and drive cables, is not represented in greater detail in the block diagram in FIG. 1. The user control element 9 is a two-stage rocker switch 9. Said switch has a first direction of actuation 19 and a second direction of actuation 21. The switch positions situated in the first direction of actuation 19, i.e. the contacts 1 and 2, are assigned to the opening operation; the switch positions situated in the second direction of actuation 21, i.e. the contacts 3 and 4, are assigned to the closing operation. The switching contact 14 of the rocker switch 9 is in a horizontal zero position in FIG. 1. From this horizontal zero position, by tilting about the axis 22 in the direction of actuation 19, first the first switch position 1 is assumed and then the second switch position 2. Correspondingly, by tilting in the other direction 21, first the first switch position 3 is assumed, then the second switch position 4. Electrical leads 5, 6, 7, 8 connect the individual switch positions with the control circuit 20 or 11. If, for example, the rocker switch 9 is tilted in a clockwise direction, the switching contact 14 contacts the contact 1. The electrical lead 5 transmits this switching signal to the "Open" input stage of the control circuit 11 of the sunscreen cover and the motor 12 slides said cover in the opening direction. The electrical lead 6 connects the contact 2 with the input stage "Open" of the control circuit 20 of the sunroof cover. Thus, if the tilting movement is continued, the sunroof cover is also given the command to open. An equivalent process applies for closing. As can be seen from the block diagram in FIG. 1, the contacts 3, 4 are connected by leads 7, 8 (indicated by broken lines in FIG. 1) with the respective input stages "Close" of the control circuit 20 or, as the case may be, 11.

The movement sequence when opening or closing can be switched between a manual or automatic mode of operation according to the duration of the switching action in one of the first switch positions. This is described in greater detail below.

In the exemplary embodiment shown in FIG. 1, the manual operating mode is assumed if the actuation time is longer than 1 second in the switch position 1 or 3. The control circuits 11, 20 evaluate the duration of the switching signals of the rocker switch 9 in such a way that in the manual operating mode the movement of the sunscreen cover is maintained for as long as the manual switching action lasts or until the respective final position is reached.

The automatic mode of operation is assumed if the switching action takes place within a preset time interval. A time interval of approximately 0.2 seconds to one second has proved advantageous. The movement operation, which runs automatically, ends when the sunscreen cover has reached the final position, or by any new depression of the switch.

According to the invention, when starting from a final position, both in the manual and in the automatic operating mode, it is always the sunscreen alone that is moved first, followed by the cover.

Figure 2:
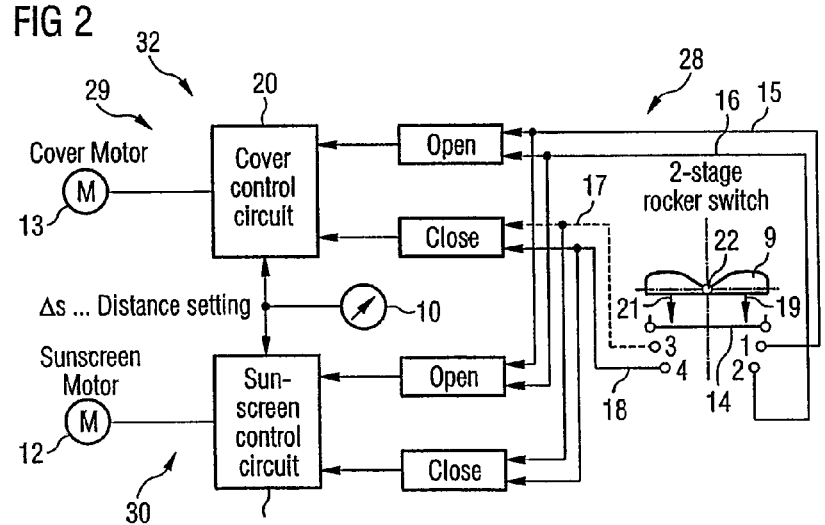
FIG. 2 shows block diagram of a second exemplary embodiment in which the automatic operating mode is position-controlled.
Figure 3A:
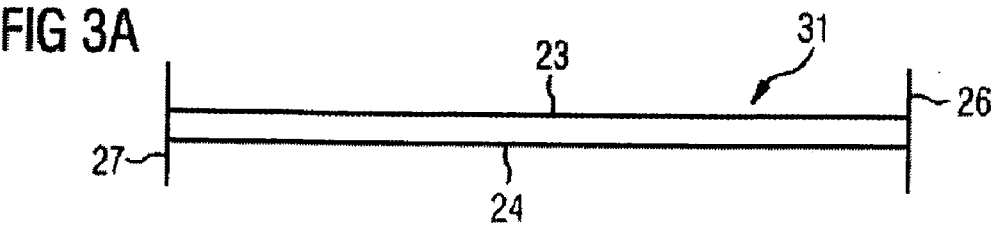
FIG. 3 shows the movement sequence of sunroof cover and sunscreen cover outlined in snapshots a to e during opening.
Figure 3B:
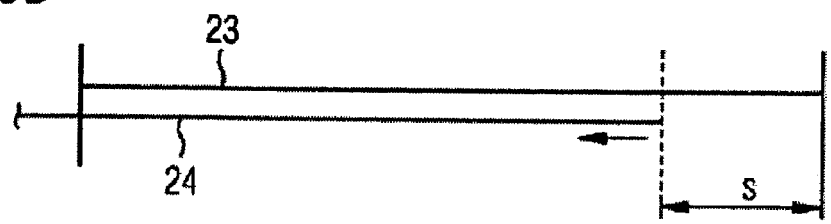
Figure 3C:
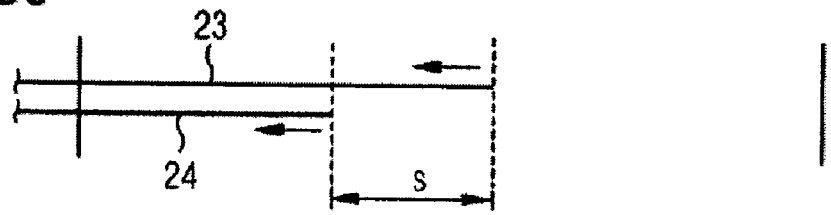
Figure 3D:
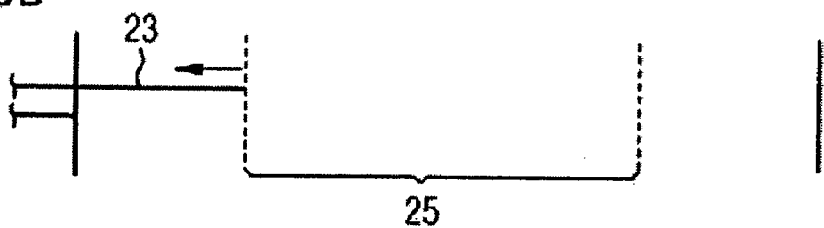
Figure 3E:
Figure 4A:
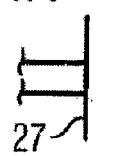
FIG. 4 shows the movement sequence of sunroof cover and sunscreen cover outlined in snapshots a to e during closing.
Figure 4A:
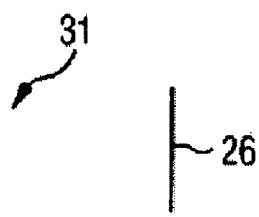
Figure 4B:
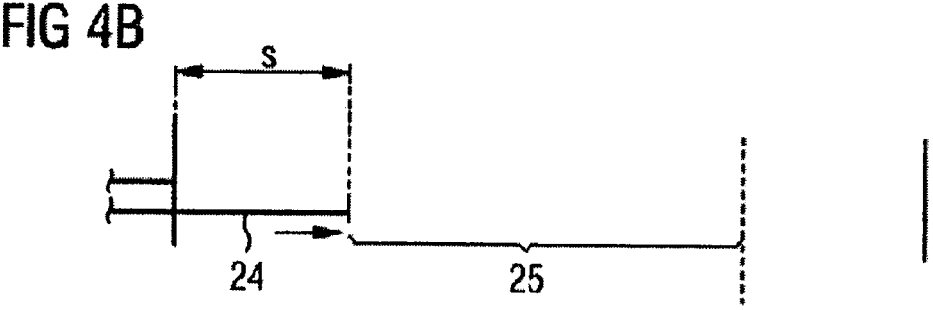
Figure 4C:
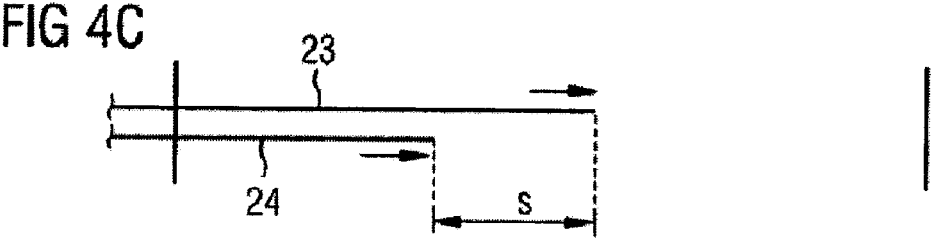
Figure 4D:
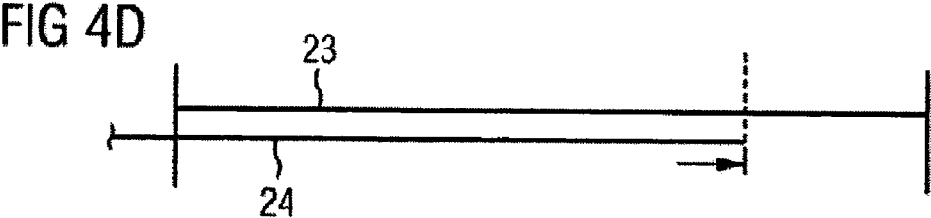
Figure 4E:
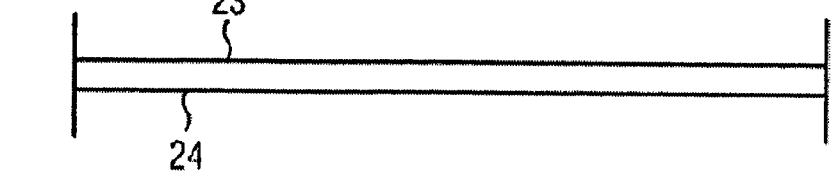

FIG. 2 shows a second exemplary embodiment of the invention. As opposed to FIG. 1, in this case the automatic operating mode is position-controlled, that is to say it is preset by the switch positions of the rocker switch 9. The contacts 1 and 2 are routed respectively through leads 15, 16 to the two input stages "Open" of the control circuits 11 and 20. The same applies to the contacts of the switch positions 3 and 4, which are also switched to the two input stages "Close" of the control circuits 11 and 20 through the leads 17 and 18 respectively. The switch positions 1 and 2 in the first direction of actuation 19 are again assigned to the opening operation, and the switch positions 3 and 4 to the closing operation. In the switch setting 1 and 3, the control circuit 11 and 20 respectively is instructed to open or close manually. In the switch setting 2 and 4, the command to close automatically is given. Here too, the respective sliding movement lasts as long as the rocker switch 9 is pressed. The movement stops when the rocker switch 9 is released and springs back into its zero position, or when a final position is reached. In automatic mode, the movement operation triggered is maintained until one of the positions is reached, or the movement operation is stopped by a new switching action whereby the rocker switch 9 is operated again briefly in one of the two directions 19 or 21.

The movement of the sunroof cover is linked to the movement of the sunscreen cover. As described in greater detail below with reference to FIGS. 3 and 4, this movement takes place in unison in a middle range of the sliding distance and is offset by a distance s preset by the second user control element 10. The user control element 10 is linked both to the control circuit 20 of the sunroof cover and also to the control circuit 11 of the sunscreen cover.

In FIG. 3, various stages of an opening movement are outlined in sequence one after the other. In FIG. 3a, neither of the drives 29 or 30 is active and the opening 31 is completely closed by the sunroof cover 23 and the sunscreen cover 24. If, from this completely closed position, a command to open is now given by manually operating the user control element 9, then, according to the invention, first the sunscreen cover 24 is moved in the direction of the arrow in FIG. 3b from right to left. After covering a distance s, which can be preset by the second user control element 10, the sunroof cover 23 also starts to open. In FIG. 3c, the sunscreen cover 24 and sunroof cover 23 have reached a middle sliding range 25 of the opening 31. In this range 25, the two covers 23 and 24 are moved at the same speed. In the process the sunscreen cover 24 pulls the sunroof cover 23 "along behind it", offset by the distance s. When the sunroof cover 23 has covered the middle sliding distance 25, the sunscreen cover 24 has already reached the edge 27 on the opening side. After covering the remaining distance s, the sunroof cover 23 also assumes the fully opened position (FIG. 3e).

FIG. 4 shows different stages in the movement sequence during closing. Here too, according to the invention, starting from a fully opened position (FIG. 4a) in which both drives are stopped, a close command causes the sunscreen cover 24 to be moved first. In FIG. 4b this movement runs from left to right and is indicated by an arrow. As soon as the sunscreen cover 24 has passed the path s, the sunroof cover 23 begins to move. Within the middle sliding range 25 the movement is again in synchronism, which is to say that both covers 23 and 24 move at the same speed in the direction of the edge 26 on the closing side. Within the range 25, the sunscreen cover 24 pushes the sunroof cover 23 "along in front of it" again, offset by the distance s. In FIG. 4d the sunroof cover 23 has reached the edge 26 on the closing side and hence its closed position. In FIG. 4e, the sunscreen cover 24 has also arrived at its final position and the frame opening 31 is completely closed by both covers 23 and 24.

What is claimed is:

1. A device for opening/closing an opening in a vehicle roof by means of a transparent sunroof cover and an opaque sunscreen cover, each of which are driven separately from the other, wherein an activation of the transparent sunroof cover is dependent on an activation of the opaque sunscreen cover as a function of a manual actuation of a control device such that from a fully open or a fully closed position, respectively, first the sunscreen cover is slid in or out of the opening.

2. A device according to claim 1, wherein the control device comprises a first user control element with two directions of actuation, a first direction of actuation being assigned to opening and a second direction of actuation being assigned to closing.

3. A device according to claim 2, wherein the control device comprises a second user control element by means of which it is possible to set an offset by which the sunroof cover follows or precedes the sunscreen cover in a middle range of the sliding distance, in which middle range the sunroof cover and the sunscreen cover are moved in synchronism.

4. A device according to claim 2, wherein a movement sequence during opening or closing is dependent on the actuation time of the first user control element.

5. A device according to claim 4, wherein a manual mode of operation or an automatic mode of operation can be selected as a function of the actuation time.

6. A device according to claim 2, wherein the first user control element has two switch positions in each direction of actuation, which positions are assigned to the sunscreen cover and in which positions the manual or automatic operating mode can be selected as a function of the actuation time, and wherein from this first switch position a second switch position that is assigned to the sunroof cover can be switched to.

7. A device according to claim 5, wherein an actuation time of 0.2 seconds to one second triggers the automatic operating mode and an actuation time greater than 1 second triggers the manual operating mode.

8. A device according to claim 2, wherein the first user control element has two switch positions in each direction of actuation, the first switch positions nearest to the zero position being assigned to the manual operating mode, and the two switch positions further away from the zero position being assigned to the automatic operating mode.

9. A device according to claim 5, wherein the first user control element is a two-stage rocker switch or a two-stage rotary knob.

10. A device according to claim 2, wherein the second user control element is a continuously variable rotary knob.

11. A device according to claim 10, wherein a resistance must be overcome when actuating the first and/or second user control element.

12. A method of opening a vehicle sunroof comprising:
a transparent sunroof cover which can be actuated as a function of a manual actuation of a control device; and
an opaque sunscreen cover which can be actuated separately from the transparent sunroof cover as a function of a manual actuation of the control device, the method comprising the steps of:
from a fully open position of the transparent sunroof cover and the opaque sunscreen covers, the activation of the transparent sunroof cover is dependent on an activation of the opaque sunscreen cover; and
from a fully closed position of the transparent sunroof cover and the opaque sunscreen covers, the activation of the transparent sunroof cover is dependent on an activation of the opaque sunscreen cover,
wherein the control device comprises a first user control element with two directions of actuation, a first direction of actuation being assigned to opening and a second direction of actuation being assigned to closing,
wherein the control device comprises a second user control element by means of which it is possible to set an offset by which the sunroof cover follows or precedes the sunscreen cover in a middle range of the sliding distance, in which middle range the sunroof cover and the sunscreen cover are moved in synchronism.

13. A method according to claim 12, wherein a movement sequence during opening or closing is dependent on the actuation time of the first user control element.

14. A method according to claim 13, wherein a manual mode of operation or an automatic mode of operation can be selected as a function of the actuation time.

15. A method according to claim 12, wherein the first user control element has two switch positions in each direction of actuation, which positions are assigned to the sunscreen cover and in which positions the manual or automatic operating mode can be selected as a function of the actuation time, and wherein from this first switch position a second switch position that is assigned to the sunroof cover can be switched to.

16. A method according to claim 14, wherein an actuation time of 0.2 seconds to one second triggers the automatic operating mode and an actuation time greater than 1 second triggers the manual operating mode.

17. A method according to claim 12, wherein the first user control element has two switch positions in each direction of actuation, the first switch positions nearest to the zero position being assigned to the manual operating mode, and the two switch positions further away from the zero position being assigned to the automatic operating mode.

18. A method according to claim 12, wherein a resistance must be overcome when actuating the first and/or second user control element.

19. A method of opening a vehicle sunroof comprising:
a transparent sunroof cover which can be actuated as a function of a manual actuation of a control device; and
an opaque sunscreen cover which can be actuated separately from the transparent sunroof cover as a function of a manual actuation of the control device, the method comprising the steps of:
from a fully open position of the transparent sunroof cover and the opaque sunscreen covers, the activation of the transparent sunroof cover is dependent on an activation of the opaque sunscreen cover; and
from a fully closed position of the transparent sunroof cover and the opaque sunscreen covers, the activation of the transparent sunroof cover is dependent on an activation of the opaque sunscreen cover,
wherein a first user control element has two switch positions in each direction of actuation, the first switch positions nearest to the zero position being assigned to the manual operating mode, and the two switch positions further away from the zero position being assigned to the automatic operating mode.

* * * * *